(12) United States Patent
Kott et al.

(10) Patent No.: US 7,236,484 B2
(45) Date of Patent: Jun. 26, 2007

(54) METHODS AND SYSTEMS FOR PROVIDING WIDE-BAND VOICE SERVICE VIA A TELEPHONE SWITCH SYSTEM

(75) Inventors: Joseph John Kott, Aurora, IL (US); Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1043 days.

(21) Appl. No.: 10/200,368

(22) Filed: Jul. 22, 2002

(65) Prior Publication Data

US 2004/0013122 A1 Jan. 22, 2004

(51) Int. Cl.
*H04L 12/66* (2006.01)
*H04J 3/16* (2006.01)

(52) U.S. Cl. .................. 370/352; 370/401; 370/468

(58) Field of Classification Search ................ 370/352, 370/353, 354, 355, 356, 395.2, 395.21, 401, 370/465, 484, 498, 540, 468
See application file for complete search history.

(56) References Cited

U.S. PATENT DOCUMENTS

| | | | |
|---|---|---|---|
| 6,574,222 B1 * | 6/2003 | Medhat et al. ........... 370/395.1 |
| 6,614,781 B1 * | 9/2003 | Elliott et al. ................. 370/352 |
| 6,731,744 B1 * | 5/2004 | Khuc et al. ............ 379/265.01 |
| 6,836,515 B1 * | 12/2004 | Kay et al. .................... 375/260 |
| 6,868,081 B1 * | 3/2005 | Akram et al. ................ 370/356 |
| 6,882,652 B1 * | 4/2005 | Scholtens et al. ........... 370/401 |
| 2002/0191760 A1 * | 12/2002 | Wattwood et al. ....... 379/93.01 |

\* cited by examiner

*Primary Examiner*—Chau Nguyen
*Assistant Examiner*—Kerri M Rose (57) ABSTRACT

Methods and systems for providing wide-band voice service via a telecommunications switch are described herein. A call can be initiated from a wide-band telecommunications device (e.g., an IP telephone) to another telecommunications device through a gateway (e.g., an IP gateway) associated with one or more telecommunications networks, such as, for example, a WAN, LAN and/or PSTN. One or more digital signals (e.g., 4 or fewer DS0s) can then be reserved for the call, if a telecommunications switch (e.g., a class 5 circuit switch, 5ESS®, etc.) associated with one or more of the telecommunications networks determines that at least one timeslot is available to permit a transfer of the call to the other telecommunications device. Thereafter, a wide-band signal converted from the digital signal carrying the call from the gateway to the other telecommunications device can be passed over a telecommunications interface, such as a GR-303 connection, as determined by the telecommunications switch to the other telecommunications device.

20 Claims, 4 Drawing Sheets

METHODS AND SYSTEMS FOR PROVIDING WIDE-BAND VOICE SERVICE VIA A TELEPHONE SWITCH SYSTEM

TECHNICAL FIELD

The present invention is generally related to telecommunications networks. The present invention is also related to IP telephones and IP telephony. The present invention is also related to methods and systems for transmitting wide-band voice data over IP networks and standard WAN/LAN and PSTN networks. The present invention is additionally related to telecommunications switches and gateways.

BACKGROUND OF THE INVENTION

In the last several years, tremendous interest has developed in the "IP telephony" technological area. IP telephony generally involves the transmission of telephone calls through packet-switched data networks employing the Internet Protocol (IP), which is utilized to send data over the Internet. When referring to an IP network, those skilled in the art generally refer to their Local Area Network (LAN) and/or Wide Area Network (WAN) as networks that can communicate with the Internet. The term Internet Protocol and its acronym IP are well known in the telecommunications arts and generally refers to a telecommunications standard covering software and algorithms thereof that keep track of internet addresses for different nodes, routes outgoing messages, and recognizes incoming messages. IP permits a packet to traverse multiple networks on the way to its final destination.

In order to take advantage of the inherent flexibility of IP networks, such as the Internet, IP telephones have been developed, which are configured with IP telephony features. From an end user perspective, the IP telephone typically appears similar to a standard telephone. Most IP telephones include a handset that the user can pick up, speak into, and listen through. IP telephones also typically posses a push button numerical keypad for dialing. When a caller dials a number, the IP telephone signals which keys have been activated and sends this information through the LAN/WAN. IP telephones are different from traditional phones in that they can directly connect to the LAN/WAN in the same manner as, for example, a desktop computer. With most IP telephones, the desktop computer data line can then connect directly to a hub in the IP telephone for network access. Thus, the advantage of an IP telephone is that only a single Ethernet line is required for providing both phone communications and computer network access.

Currently, the common approach to IP telephony involves the use of a speech encoder to compress 8 kHz sampled speech to a low bit rate, package the compressed bit-stream into packets, and then transmit the packets over IP networks. At the receiving end, the compressed bit-stream can be extracted from the received packets, and a speech decoder can be used to decode the compressed bit-stream back to 8 kHz-sampled speech. The term "codec" (coder and decoder) is commonly used to denote the combination of the encoder and the decoder. The current generation of IP telephony products typically uses existing speech codecs that were designed to compress 8 kHz telephone speech to very low bit rates. Examples of such codecs include the ITU-T G.723.1 at 6.3 kb/s, G.729 at 8 kb/s, and G.729A at 8 kb/s. All of these codecs have somewhat degraded speech quality when compared with the ITU-T 64 kb/s G.711 PCM and, of course, they all still have the same 300 to 3,400 Hz bandwidth limitation. IP telephones currently operate using traditional G.711 64 kbps codecs. These 64 kbps samples are grouped together at the IP Endpoint (i.e., phone or CPE gateway) and sent initially over a LAN and a WAN and thereafter to an IP gateway.

Note that the acronym CPE generally refers to "Customer Provided Equipment" or "Customer Premises Equipment." At the IP gateway the individual 64 kbps samples are unpacked and sent over a GR-303 or V5 interface to a class 5-circuit switch as one 64 kbps DS0. Note that the term "GR-303" refers to a well-known telecommunications standard covering high-level control interfaces to dumb switches. GR-303 comprises generic requirements for next-generation integrated digital loop carrier systems. The acronym "DS" generally refers to "Digital Signal," and is commonly utilized in the context of DS0, DS1, DS2, etc. Thus, "digital signal X" or DSX is a term which refers to the series of standard digital transmission rates or levels based on DS0, a transmission rate of 64 Kbps, the bandwidth normally used for one telephone voice channel. Both the North American T-carrier system and the European E-carrier systems of transmission operate using the DS series as a base multiple. The digital signal is carried inside the carrier system. DS0 is the base for the digital signal X series.

Wide-band IP telephones are currently being developed for use with IP PBXs. An IP PBX can switch these wide-band 256 kbps voice signals from one IP telephone to another offering broader frequency response and dynamic range. Currently, however, an IP gateway interfacing with a class 5 switch cannot switch this 256 kbps wide-band voice traffic. The present inventors have thus concluded, based on the foregoing, that a need exists for improved methods and systems for switching this wide-band voice traffic.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide improved telecommunications methods and systems.

It is yet another aspect of the present invention to provide methods and systems for providing wide-band voice services via a telecommunications switch.

It is still another aspect of the present invention to provide methods and systems for providing improved IP telephony.

It is also an aspect of the present invention to provide methods and systems for the provision of improved quality of voice data through IP telephones and other wide-band telecommunications devices.

The above and other aspects of the invention can be achieved as will now be briefly described. Methods and systems for providing wide-band voice service via a telecommunications switch are described herein. A call can be initiated from a wide-band telecommunications device (e.g., an IP telephone) to another telecommunications device through a gateway (e.g., an IP gateway) associated with one or more telecommunications networks, such as, for example, a WAN, LAN and/or PSTN. One or more digital signals (e.g., 4 or fewer DS0s) can then be reserved for the call, if a telecommunications switch (e.g., a class 5 circuit switch, 5ESS®, etc.) associated with one or more of the telecommunications networks determines that a sufficient number of timeslots are available to permit a transfer of the call to the other telecommunications device. Thereafter, a wide-band signal converted from the digital signal carrying the call from the gateway to the other telecommunications device can be passed over a telecommunications interface, such as a GR-303 connection, as determined by the telecommunications switch to the other telecommunications device.

Additionally, a lead digital signal can be utilized to establish a connection between the IP telephone and the other telecommunications device, which may or may not be an IP telephone. Similarly, the other telecommunications device may or may not be a wide-band telecommunications device. The present invention, which is described in greater detail herein, thus discloses methods and systems for providing wide-band voice service via a telephone switch system. Additionally, the present invention provides for methods and systems that take advantage of the stability and power of modern class 5 switches to provide up to 256 kbps clarity for IP telephone calls utilizing IP telephony over IP networks and standard WAN/LAN and/or PSTN networks.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
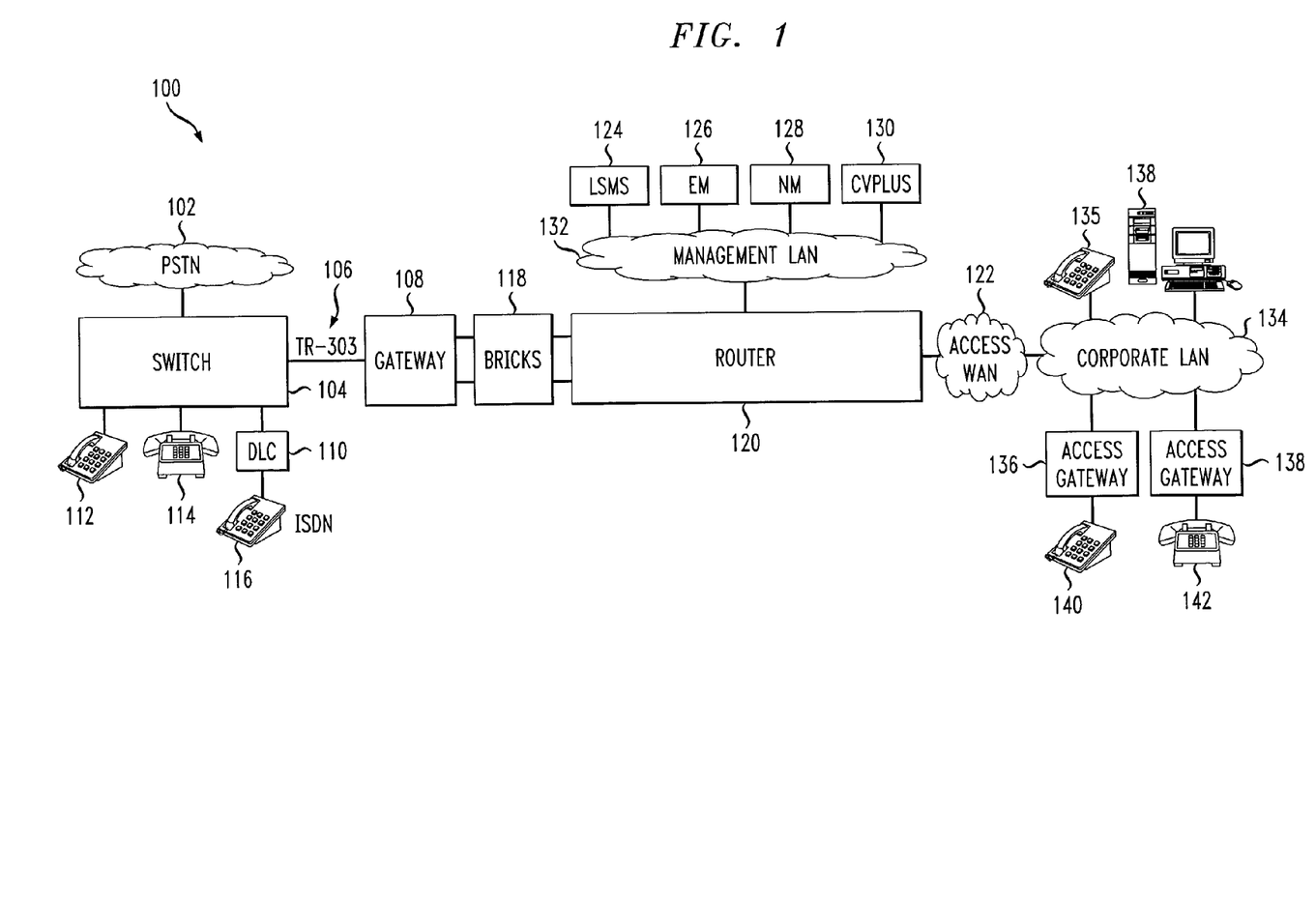
FIG. 1 illustrates a block diagram illustrating a high-level telecommunications architecture, which can be implemented in accordance with a preferred embodiment of the present invention.

FIG. 1 illustrates a block diagram 100 illustrating a high-level telecommunications architecture, which can be implemented in accordance with a preferred embodiment of the present invention. As indicated in block diagram 100, a Public Switched Telephone Network (PSTN) can be coupled to a switch 104, which can include, for example a 7R/E™ or Class 5 switch such as the 5ESS® switch referred to herein. Note that the acronym PSTN generally refers to the worldwide voice telephone network accessible to those with telephones and access privileges. Switch 104 is generally coupled to a plurality of telecommunications devices, including telephones 112 and 114. Switch 104 can be further coupled to a Digital Loop Carrier (DLC) 110 and a gateway 108. Note that gateway 108 can include a gateway such as an iMerge CFG. Note that the acronym "CFG" refers generally to "Centrex Feature Gateway," a term well known in the telecommunications arts. The "iMerge CFG" is manufactured by AG Communications Systems, a subsidiary of Lucent Technologies, Inc. An iMerge CFG provides all the features and services of a Class 5 central office switch over an IP network by using the standard GR-303 interface discussed earlier.

DLC 110 generally includes network transmission equipment, which can be utilized to provide pair gains on a local loop. A DLC system typically derives multiple channels (e.g., 64 kbps voice grade) from a single four-wire distribution cable running from a central office to a remote site. DLC 110 can further be coupled to one or more phones 116, which communicate with an Integrated Services Digital Network (ISDN), well known in the telecommunications arts. Gateway 108 can further communicate with a firewall brick 118, which in turn communicate with a router 120. Note that the firewall brick 118 can be configured as a carrier-grade integrated firewall and virtual private network (VPN) gateway appliance specifically designed for web/application data center security, large-scale managed security services, and remote access VPN services. This device can be generally referred to as a "brick" because of its rugged, reliable design, thus making it an ideal platform for service providers seeking wide scalability, ready manageability, and industry-leading performance. Its next-generation capabilities can include a full 1-Gigabit throughput, VLAN support with security policy filtering, and high availability with state-sharing. An example of a firewall brick is the Brick 1000 device manufactured by Lucent Technologies, Inc., which is a member of the VPN Firewall family, the security foundation of Lucent's IP services portfolio. Brick 1000 units interoperate seamlessly with other family members, including Lucent's Brick models 20, 80, and 201.

Router 120 in turn communicates with a management LAN 132, which can be further coupled to a Lucent Security Management Server (LSMS) 124, an element manager (EM) module 126, a network management (NM) module 128 and a CVPlus 130. Note that LSMS 124 can function as a mechanism that enables rapid provisioning and management of IP services-including advanced security, IP Virtual Private Networks (VPNs), and web/application hosting, along with firewall capabilities. LSMS 124 includes a carrier-class management system that can centralize the provisioning, reporting, logging, and monitoring required in large-scale, multi-customer/multi-site networks.

EM module 126 includes an element manager module, which can be implemented as software and/or hardware utilized to manage and monitor components of a telecommunications network at the lowest level thereof. NM module 128 includes a network management module, which functions as the business process that constantly monitors the state of an associated telecommunications network and invokes changes to the network when outages or problems occur. In an ATM network, an NM is generally considered the body of software in a switching system that provides the ability to manage particular protocols thereof. Router 120 also can communicate with a CVPlus module 130. Note that the acronym "CVPlus" generally refers to "Cajun View Plus," a well-known software package well known in the computer and networking arts. CVPlus module 130 includes the EM/EMS for router 120. Router 120 can additionally communicate with an access WAN 122, which in turn can communicate with a corporate LAN 134. Corporate LAN 134 can communicate with one or more telephones 135 and one or more computers 138. Additionally, corporate LAN 134 can communicate with an access gateway 136 and an access gateway 138, which are respectively, connected to telephones 140 and 142.

Figure 2:
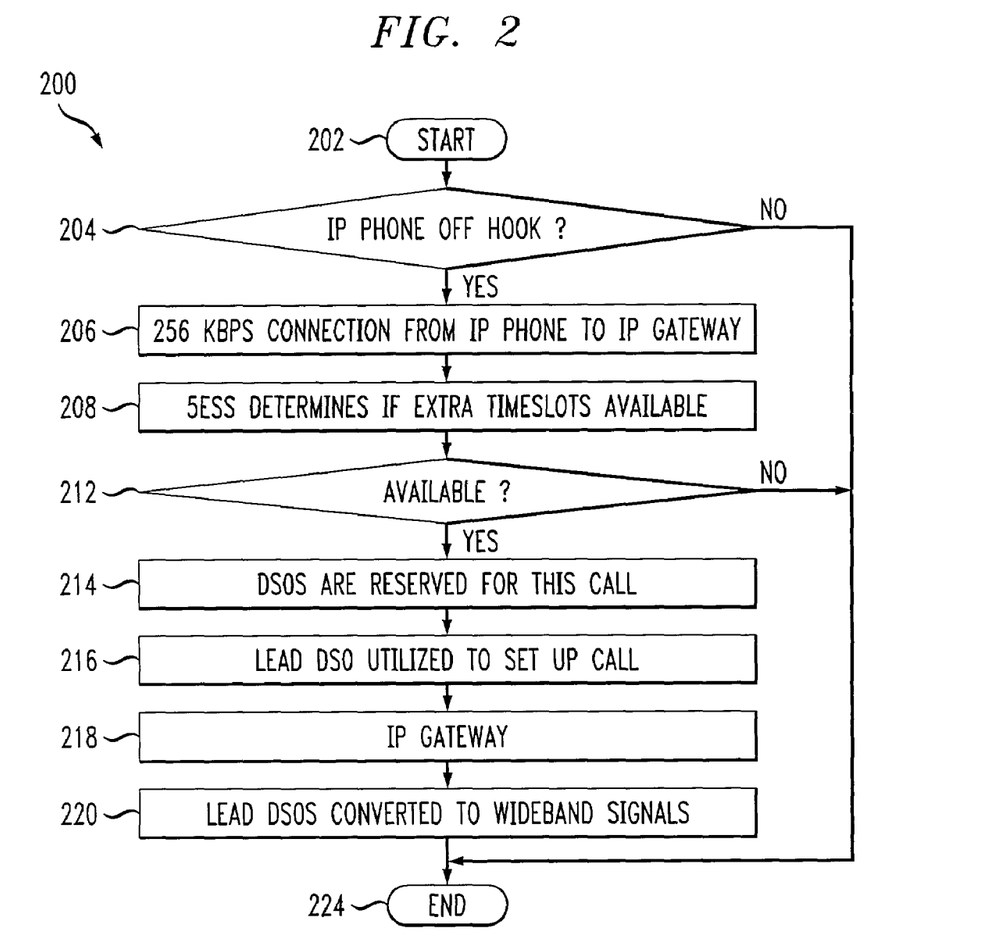
FIG. 2 depicts a high-level flow chart of operations illustrating operational steps, which can be implemented in accordance with a preferred embodiment of the present invention.

FIG. 2 illustrates a high-level flow chart 200 of operations illustrating operational steps, which may be followed in accordance with a preferred embodiment of the present invention. As illustrated at block 202, the process can be initiated. As indicated at block 204, a determination can be made whether or not a 256 kbps IP telephone goes has gone off the hook. If so, then the process continues, as described next at block 206. If not, then the process terminates, as indicated at block 224. If the 256 kbps IP phone goes off hook, then as illustrated at block 206, a 256 kbps connection can be made from the IP telephone to an IP gateway. Thereafter, as described at block 208, a 5ESS® switch can determine if extra timeslots are available. Note that the 5ESS® switch includes a multi-service, software-based, packet ready switching system designed by Lucent Technologies, Inc. The 5ESS® switch is a key element of Lucent's 7R/E™ Networks architecture, a convergent architecture that provides both cost-saving packet functionality and high-quality voice functionality, and which can bridge the transition from voice to packet functionality.

If, as indicated at block 212, extra timeslots are not available, then as illustrated at block 224, the process simply terminates and the IP gateway converts the 256 kbps Wide-band channel to a 64 kbps DS0 channel for completion through the 5ESS® switch. If, however, as depicted at block 212, enough extra timeslots are available, then a particular number of DS0s can be reserved for this call, as indicated at block 214. For example, 4 DS0s may be reserved for this call. Alternatively, a limit can be set such that if a particular percentage (e.g., 80%) of available timeslots are in use, then less than 4 DS0s may be used for this call. Thus, according to the operation described at block 214, one or more digital signals (i.e. DS0s) can be reserved for the call, if a telecommunications switch associated with a telecommunications network such as a WAN/LAN and/or PSTN, determines that one or more timeslots are available to permit a transfer of the call to another telecommunications device, which may or may not include an IP telephone or another wide-band telecommunications device.

As illustrated next at block 216, the lead DS0 can be used to set up the call. Note that features such as dial tone, audible ring, and other in-band signaling can utilize this lead DS0. If the call is completed to another wide-band capable endpoint and there are also enough extra timeslots available on the terminating side, then 4 time slots can be reserved for that user as well. Call setup at this end can also utilize the lead DS0. The lead DS0 can be utilized for features such as caller id tones, in-band signaling, and power ring cadencing. As indicated next at blocks 218 and 220, at the IP gateway lead DS0s during call setup can be converted to wide-band 256 kbps signals.

Figure 3:
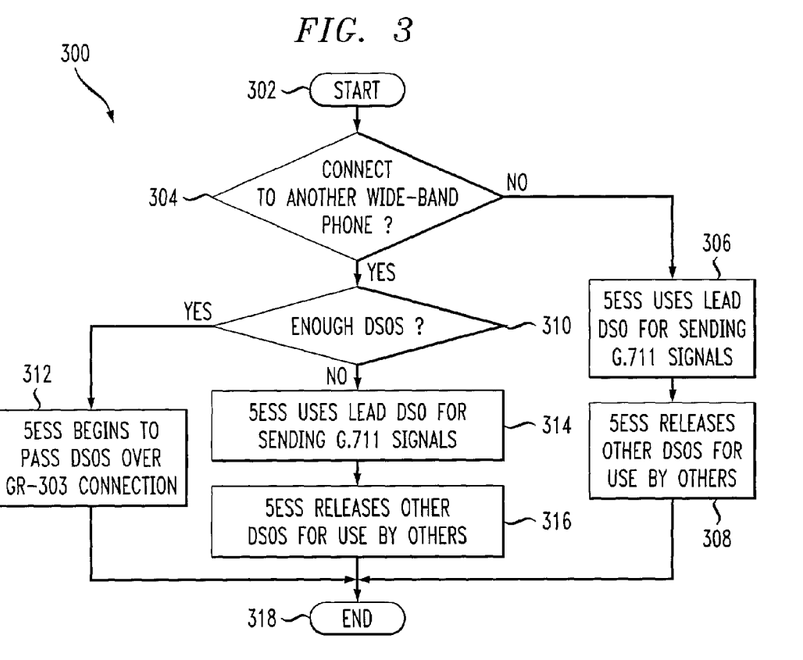
FIG. 3 depicts a high-level flow chart of operations illustrating continued operational steps, which can be implemented in accordance with a preferred embodiment of the present invention.

FIG. 3 depicts a high-level flow chart 300 of operations illustrating continued operational steps, which can be implemented in accordance with a preferred embodiment of the present invention. The process can be initiated, as indicated at block 302. As illustrated at block 304, a determination can be made whether or not an originator is attempting to connect to another wide-band phone. If the originator is trying to connect to another wide-band telephone, then the operation described at block 310 can be processed. The operation illustrated at block 310 will be described in greater detail shortly. If, however, the originator is not attempting to connect to another wide-band phone, then as illustrated at block 306, the 5ESS® will use the lead DS0 as the DS0 over which G.711 signals are sent. As indicated next at block 308, the 5ESS® switch can release the other 3 DS0s for use by others. Following processing of the operation illustrated at block 308, the process can then terminate, as indicated at block 318.

If, as indicated at block 304, the originator is attempting to connect to another wide-band phone, then the operation described at block 310 is processed. As depicted at block 310, a determination can be made whether or not the call has been terminated on another wide-band phone and additionally, if enough DS0s are available for use by both the originator and terminator. If not, then operations similar to those described at blocks 306 and 308 can be processed. Thus, as indicated block 314, the 5ESS® switch can use the lead DS0 as the DS0 over which G.711 signals are sent. Thereafter, as illustrated at block 316, the 5ESS® switch can release the other 3 DS0s for use by others. If, as indicated at block 310, enough DS0s are available for use by both the originator and the terminator and the call has been terminated on another wide-band phone, then as depicted at block 312, the 5ESS® switch can begin to pass 4 DS0s over the GR-303 connection by passing the full 256 kbps signal and not converting the 256 kbps signal to a 64 kbps signal as utilized for call setup. The process can thereafter terminate as indicated at block 318. It can thus be appreciated from the foregoing, that the operation illustrated at block 310 can determines if enough DS0s are available at the terminator, while the operation described at block 304 can determine another wide-band phone is being connected. Thus, if the call is in the process of connecting to another wide-band phone and enough DS0s are available, then the operation illustrated at block 312 can be processed following a proper decision as indicated at block 310.

Note that if the call is terminated on a line that is not wide-band equipped, the IP gateway can continue to convert the 256 kbps signal to a 64 kbps signal for termination in the narrow-band network. Note that the 5ESS® switch signals required by the IP gateway to be sent to the 256 kbps mode via the line side can answer supervision signals thereof. Additionally, if not enough DS0s are available to reserve 4 DS0s for a wide-band call, a smaller number, such as 3, 2, or 1, can be used instead. To simply the situation, anywhere from 4 to 1 DS0s may be utilized.

Those skilled in the art can appreciate that the operational steps depicted in FIGS. 2 and 3 can be implemented as a program product (i.e., computer program product) composed of one or more modules. The term "module" as utilized herein thus generally refers to a software module, but may also refer to hardware equipment (i.e., physical modules), which may or may not operate independently of specific software. In the computer programming and telecommunications arts, a module can be implemented as a collection of routines and data structures that performs particular tasks or implements a particular abstract data type. Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module can be based. Thus, when referring to a "module" herein, the present inventors are referring so such software modules or implementations thereof.

It can further be appreciated by those skilled in the art that the methods and systems described herein, including, for example, the CPE illustrated herein can be implemented as a series of modules either function alone or in concert with physical electronic and computer hardware devices. Such modules can be utilized separately and/or together locally and/or remotely to form a program product thereof that can be implemented through signal-bearing media, including transmission media and recordable media. The present invention can be implemented as a program product composed of a plurality of such modules, which can be interactively displayed for a user on a display screen of a data-processing system (e.g., computer). Such interactivity may be provided by a graphical user interface (GUI), which is well known in the art, including Internet browser applications thereof. The logical operations described in FIGS. 2 and 3, for example, can be implemented as a one or more modules.

Figure 4:
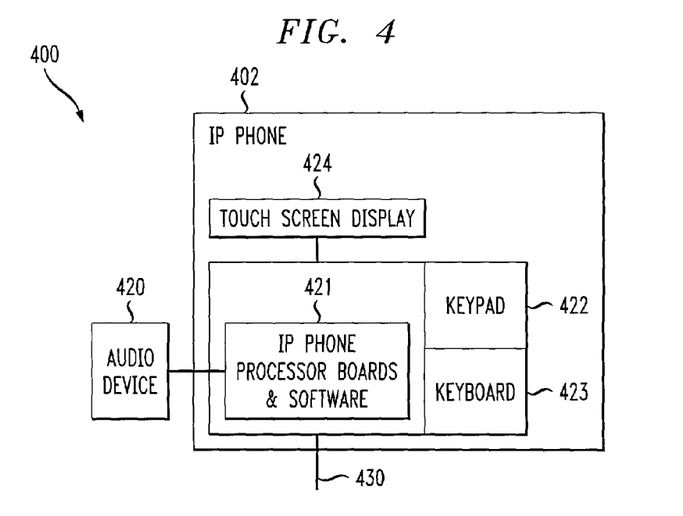
FIG. 4 illustrates a block diagram of an IP telephone, which can be utilized in accordance with a preferred embodiment of the present invention.

FIG. 4 depic a block diagram 400 illustrating an IP telephone 402, which can be utilized in accorda ce with a preferred of the present invention. IP telephone 402 generally includes touch screen display 424, which can be in communication with a processor 421, whi h generally includes IP telephone processor boards and associated software (i.e., mod les). Processor 421 can b0 associated with a keypad 422 and a keyboard 423 which each permit a user to enter data. Additionally, an audio device 420 communicates with processor 421. IP telephone 402 of FIG. 4 is analogous to IP telephones 112, 140 and 135 of FIG. 1. Although a particular arrangement of IP telephone elements are depicted in FIG. 4, it can be appreciated by those skilled in the art that such elements are not limiting features of the present invention. IP telephone 402 is thus described here for general illustrative and edification purposes only.

It can be appreciated that the foregoing description, while representing one possible embodiment of the present invention, can be modified to encompass a variety of other options. For example, instead of implementing a hard cutoff from 4 to 1 DS0 at the 80% utilization of DS0s point discussed earlier, a scheme can be implemented in accordance with the present invention, in which at the 60% point the system moves to 3 DS0s, at the 70% point to 2 DS0s, at the 80% to 1 DS0. Additionally, if it is determined that 4 DS0s takes up too many DS0s or changes the 5ESS® or IP gateway too much, then only 3 DS0s or 2 DS0s can be utilized to achieve a better than 1DS0 performance. Additionally, the 8 kHz wide-band frequency can be maintained, while limiting the amplitude range. Compressing the amplitude steps, limiting the range, or possibly limiting the range dynamically depending on the signal strength can accomplish such a configuration.

Permitting different code to run within the conference circuit service circuit can configure a wide-band conference circuit. A narrow-band conference circuit can be implemented that operates on 1 DS0 per person and a wide-band conference circuit that operates on 2, 3, or 4 DS0s per person. This would permit wide-band conferencing for wide-band endpoints. The setup would use the lead DS0. Using the standard GR-303 ISDN, 2 DS0 and 3 DS0 schemes implemented in accordance with the present invention can also allow for less changes in the IP gateway and 5ESS® switch. A similar scheme can be utilized for V5 international connections.

Figure 5:
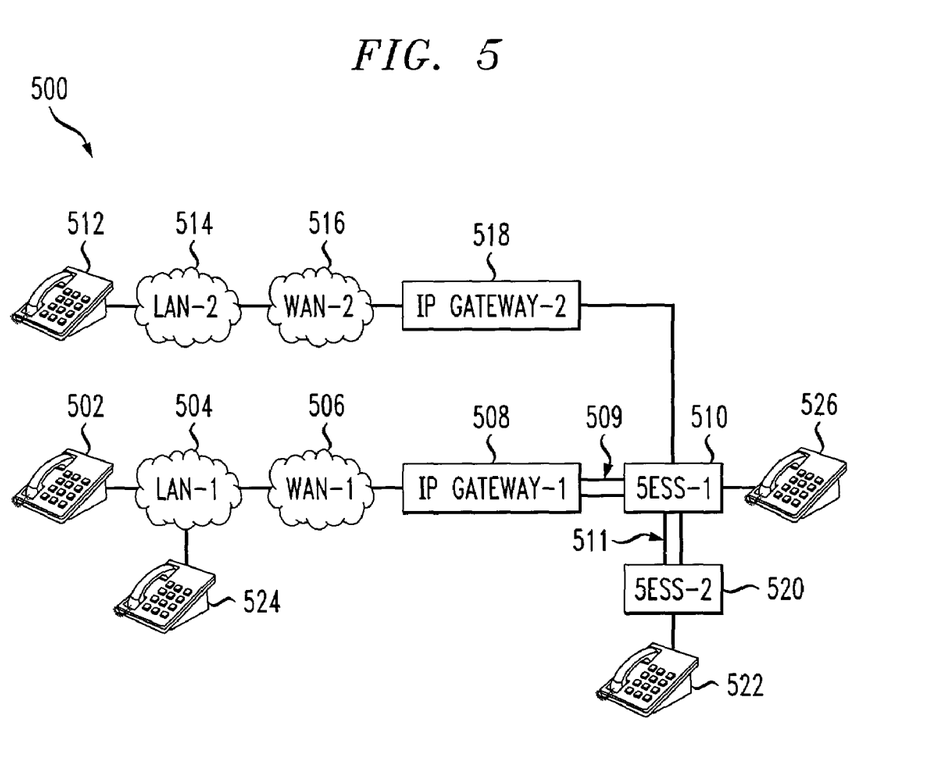
FIG. 5 depicts a high-level block diagram depicting a system for providing wide-band voice services, which can be implemented in accordance with a preferred embodiment of the present invention.

FIG. 5 depilts a high-level block diagram 500 depicting a system for providing wide-band voice services. which can be implemented in accordance with a preferred embodiment of the present invention. FIG. 5 illustrates a plurality of telephones, including telephones 502, 512, 522, 524 and 526. Telephones 502, 512 and 524 constitute wide-band ready or wide-band equipped telephones. Telephones 522 and 526, on the other hand, are not wide-band equipped or wide-band ready telephones. Telephone 502 can communicate with a LAN 504 (i.e., LAN-1), which in turn can communicate with WAN 506 (i.e., WAN-1) and telephone 524. WAN 506 in turn can communicate with an IP gateway 508 (i.e., IP Gateway-1), which in turn can communicate with 5ESS® switch 510 (i.e., 5ESS-1), over an interface 509. The 5ESS® switch 510 is an example of one type of a telecommunications switch that can be implemented in accordance with a preferred or alternative embodiment of the present invention. Rate that interface 509 can be configured as a GR-303 interface or another proprietary interface depending upon a desired implementation of the present invention.

5ESS® switch 510 in turn can communicate with a 5ESS® switch 520 (i.e., 5ESS-2) and a gateway 518 (i.e., IP Gateway-2). 5ESS® switch 520 can also communicate with a telephone 522, which as indicated earlier is not wide-band ready nor wide-band equipped. 5ESS® switch 510 can communicate with 5ESS® switch 520 over a TDM trunk 511. Note that as utilized herein the term "trunk" generally refers to a communication line between two switches or switching systems. 5ESS® switch 510 can communicate with telephone 526, which is also not wide-band ready nor wide-band equipped. Telephone 512 can communicate with a LAN 514 (i.e., LAN-2), which in turn can communicate with a WAN 516 (i.e., WAN-2). IP gateway 518 can communicate with WAN 516 and 5ESS® switch 510.

A number of scenarios, including associated methods, can be implemented based on the system indicated in FIG. 5. In a first scenario, a call can be made from telephone 502 to telephone 512. It can be assumed that telephone 502 is a wide-band ready or wide-band equipped telephone located within an office of one company, while telephone 512 is a wide-band ready or wide-band equipped telephone located within an office complex of another company. When a user of telephone 502 initially picks up telephone 502, 1 DS0 with a dial tone is sent from 5ESS® switch 510 to IP gateway 508 (i.e., IP Gateway-1).

IP gateway 508 converts the 1 DS0 to 4 wide-band DS0s and sends the call over WAN 506 (i.e., WAN-1) and LAN 504 (i.e., LAN-1) to telephone 502. When the user of telephone 502 dials telephone 512, IP gateway 508 requests 5ESS® switch 510 to reserve 4 DS0s for the connection. When the user of telephone 502 touch tones the telephone number of telephone 512, IP gateway 508 converts the 4 DS0s to 1 lead DS0 to enter into 5ESS® switch 510 (i.e., 5ESS-1). The 5ESS® switch 510 analyzes the touch-tone signals and "knows" that the telephone number of telephone 512 is also on 5ESS® switch 510. Thus, 5ESS® switch 510 reserves 4 DS0s connecting to IP gateway 518 (i.e., IP Gateway-2).

The 5ESS® switch 510 checks to make sure that the telephone number associated with telephone 512 is not busy. If it is busy, 5ESS® switch 510 sends a busy tone back in the lead DS0 to IP gateway 508, where it is converted to 4DS0s and sent to telephone 502. If it is not busy, then 5ESS® switch 510 connects 4 DS0s from IP gateway 508 to IP gateway 518 and the users of telephones 502 and 512 can then engage in a conversation that is wide-band. If, however, 4 DS0s are not available, then the users of telephones 502 and 512 are connected at a reduced amount (i.e., 3, 2, or 1).

If less than 1 DS0 is available on either side, the call cannot be connected in either wide-band or narrow-band and some form of busy signal is sent back telephone 502.

In a second scenario, a user of telephone 502 can attempt to call another user (e.g., a co-worker) at telephone 524. Recall that telephone 524 can be a wide-band ready or wide-band equipped telephone. The user of telephone 502 thus picks up telephone 502 and 1 DS0 with a dial tone is automatically sent from 5ESS® switch 510 to IP gateway 508, which converts the 1 DS0 to 4 wide-band DS0s which are transmitted over WAN 506 and LAN 504 to telephone 502. When the user of telephone 502 dials telephone 524, IP gateway 508 requests 5ESS® switch 510 to reserve 4 DS0s for the connection. When the user of telephone 502 touch tones in the telephone number of telephone 524, IP gateway 508 converts the 4 DS0s to 1 lead DS0 to enter into 5ESS® switch 510. 5ESS® switch 510 then analyzes the touch-tone signals and "knows" that the telephone number of telephone 524 is also on 5ESS® switch 510.

Thus, 5ESS® switch 510 reserves 4 DS0s connecting to IP gateway 508. 5ESS® switch 510 checks to make sure that telephone 524 is not busy. If telephone 524 is busy, 5ESS® switch 510 sends back a busy tone in the lead DS0 to IP gateway 508, where it is converted to 4 DS0s and sent to telephone 502. If telephone 524 is not busy, then 5ESS® switch 510 connects 4 DS0s from IP gateway 508 back to another 4 DS0s on IP gateway 508 and the users of telephone 502 and 524 can thus engage in a wide-band telephone conversation. If, however, 4 DS0s are not available, then telephones 502 and 524 are connected at a reduced amount (i.e., 3, 2 or 1). If less than 1 DS0 is available on either side, the call cannot be connected in either wide-band or narrow-band and some form of busy signal is transmitted back to telephone 502.

In a third scenario, a user desires to place a telephone call from telephone 502 to telephone 526. Recall that telephone 526 constitutes a narrow-band telephone, which is not wide-band ready or wide-band equipped. When the user of telephone 502 picks up telephone 502, 1 DS0 with a dial tone thereof is sent from 5ESS® switch 510 to IP gateway 508, which converts the 1 DS0 to 4 wide-band DS0s and sends them over WAN 506 and LAN 504 to telephone 502. When the user of telephone 502 dials telephone 526, IP gateway 508 requests 5ESS® switch 510 to reserve 4 DS0s for the connection. When the user of telephone 502 touch tones in the telephone number of telephone 526, IP gateway 508 converts the 4 DS0s to 1 lead DS0 to enter into 5ESS® switch 510. 5ESS® switch 510 then analyzes the touch-tone signals and "knows" that the telephone number of telephone 526 is also on 5ESS® switch 510. The 5ESS® switch 510 "knows" that telephone 526 is a POTS telephone and not wide-band capable, and thus only connects 1 DS0 to telephone 526.

The 5ESS® switch 510 checks to make sure that telephone 526 is not busy. If telephone 526 is busy, 5ESS® switch 510 sends back a busy tone in the lead DS0 to IP gateway 508, where it is converted to 4 DS0s and send to telephone 502. If telephone 526 is not busy, then it connects 1 DS0 from IP gateway 508 to telephone 526 (i.e., POTS telephone) and the users of telephone 526 and 502 can engage in a narrow-band telephone conversation. The 5ESS® switch 510 releases the other 3 unused DS0s. IP gateway 508 continues to convert 1 DS0 from the 5ESS® switch 510 to 4 DS0s, which are sent out to LAN 504 and WAN 506. If less than 1 DS0 is available, then the telephone call cannot be connected in either wide-band or narrow-band and some form of busy signal is sent back to telephone 502.

In a fourth scenario, a user of telephone 502 desires to place a call to telephone 522. When the user of telephone 502 picks up telephone 502, 1 DS0 with a dial tone is sent from the 5ESS® switch 510 to IP gateway 508. IP gateway 508 converts the 1 DS0 to wideband 4 DS0s and sends them over WAN 506 and LAN 504 to telephone 502. When the user of telephone 502 dials telephone 522, IP gateway 508 requests 5ESS® switch 510 to reserve 4 DS0s for the connection. When the user of telephone 502 touch tones in the telephone number of telephone 522, IP gateway 508 converts the 4 DS0s to 1 lead DS0 to enter into the 5ESS® switch 510. 5ESS® switch 510 then analyzes the touch tone signals and "knows" that the telephone number associated with telephone number 522 is not on the 5ESS® switch 510 and thus connects it via TDM trunk 511 to 5ESS® switch 520. The 5ESS® switch 520 "knows" that telephone 522 is a POTS telephone and is not wideband capable and thus only connects 1 DS0 to telephone 522.

In essence, both of the 5ESS® switches 510 and 520 can be utilized to analyze an identification number (e.g., a telephone number) associated with a telecommunications device (e.g., telephone 522) to determine if such a telecommunications device constitutes a wide-band telecommunications device or a narrow-band telecommunications device, thereby permitting a completion of a call from an originating wide-band telecommunications device to the other telecommunications utilizing one or more digital signals (e.g., 1, 2, 3 or 4 DS0s, including a lead signal thereof) and the telecommunications switch (e.g., 5ESS® switches 510 and / or 520) over one or more telecommunications networks, such as, for example, LAN 504 and/or WAN 506.

The 5ESS® switch 520 can check to make certain that telephone 522 is not busy. If telephone 522 is busy, then the 5ESS® switch 520 sends back a busy tone in the lead DS0 to IP gateway 508, where it is converted to 4 DS0s, which are transferred to telephone 502. It telephone 522 is not busy, then 5ESS® switch 520 connects 1 DS0 from IP gateway 508 to telephone 522 and the users of telephones 502 and 522 can engage in a narrow-band telephone conversation. The 5ESS® switch 510 releases the other 3 unused DS0s. IP gateway 508 continues to convert the 1 DS0 from the 5ESS switch 510 to 4 DS0s, which are sent out to LAN 504 and WAN 506. If less than 1 DS0 is available on either side, the call cannot be connected in either wide-band or narrow-band and some form of busy signal will be sent back to telephone 502.

Based on the foregoing it can be appreciated that the present invention thus discloses methods and systems for providing wide-band voice service via a telecommunications switch are described herein. A call can be initiated from a wideband telecommunications device (e.g., an IP telephone) to another telecommunications device through a gateway (e.g., an IP gateway) associated with one or more telecommunications networks, such as, for example, a WAN, LAN and/or PSTN. One or more digital signals (e.g., 4 or fewer DS0s) can then be reserved for the call, if a telecommunications switch (e.g., a class 5 circuit switch, 5ESS®, etc.) associated with one or more of the telecommunications networks determines that at least one timeslot is available to permit a transfer of the call to the other telecommunications device. Thereafter, a wide-band signal converted from the digital signal carrying the call from the gateway to the other telecommunications device can be passed over a telecommunications interface, such as a GR-303 connection, as determined by the telecommunications switch to the other telecommunications device.

Additionally, a lead digital signal can be utilized to establish a connection between the IP telephone and the other telecommunications device, which may or may not include an IP telephone, if the other telecommunications device includes a non-wide-band telecommunications device. The present invention, which has been described in greater detail herein, thus discloses methods and systems for providing wide-band voice service via a telephone switch system. Additionally, the present invention provides for methods and systems that take advantage of the stability and power of modern class 5 switches to provide up to 256 kbps clarity for IP telephone calls utilizing IP telephony over IP networks and standard WAN/LAN and/or PSTN networks.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

We claim:

1. A method for providing wide-band voice service via a telecommunication switch, the method comprising the steps of:
    initiating a call from a wide-band telecommunications device to another telecommunication device through a gateway associated with at least one telecommunication network;
    reserving up to four digital signals for the call, in response to a request from a gateway to a telecommunications switch associated with the at least one telecommunication network;
    analyzing an identification number associated with the another telecommunications device utilizing the telecommunications switch to determine if the another telecommunications device comprises a wide-band telecommunications device or a narrow-band telecommunications device, thereby permitting a completion of the call from the wide-band telecommunications device to the another telecommunications device utilizing the up to four digital signals and the telecommunications switch over the at least one telecommunications network; and
    sending a busy signal to the wide-band telecommunications device if at least one timeslot is not available to permit a transfer of the call to the another telecommunications device when reserving the up to four digital signals for the call.

2. The method of claim 1 further comprising the steps of:
    completing the call from the wide-band telecommunications device to the another telecommunications device as a wide-band call utilizing at least one of the up to four digital signals, if the another telecommunications device comprises a wide-band telecommunications device; and
    completing the call from the wide-band telecommunications device to the another telecommunication device as a narrow-band call utilizing at least one of the up to four digital signals, if the another telecommunications device comprises a narrow-band telecommunication device.

3. The method of claim 1 wherein the step of reserving up to four digital signals for the call, in response to a request from a gateway to a telecommunication switch associated with the at least one telecommunications network, further comprises the step of:
    reserving at least one digital signal for the call, if a telecommunications switch associated with the at least one telecommunications network determines that the at least one timeslot is available to permit a transfer of the call to the another telecommunication device.

4. The method of claim 1 further comprising the steps of:
    converting the up to four digital signals carrying the call to a wide-band signal at the gateway; and
    transferring the wide-band signal to the another telecommunications device for a completion of the call.

5. The method of claim 1 further comprising the step of:
    utilizing a lead digital signal to establish a connection between the wide-band telecommunications device and the another telecommunications device, of the another telecommunication device comprises a non-wide-band telecommunications device.

6. The method of claim 5 further comprising the step of:
    converting the wide-band signal at the gateway to a narrow-band signal if the call is terminated at a line, which is not wide-band equipped.

7. The method of claim 1 wherein the telecommunications device comprises an IP telephone.

8. The method of claim 1 wherein the telecommunications interface comprises a GR-3O3 connection.

9. The method of claim 1 wherein the telecommunications switch comprises a class 5 circuit switch.

10. A method for providing wide-band, voice service via a telecommunication switch, the method comprising the steps of:
    initiating a call from an IP telephone to another telecommunications device through a IP gateway associated with at least one telecommunications network:
    reserving up to four digital signals for the call if a telecommunications switch associated with the at least one telecommunications network determines that at least one timeslot is available to permit a transfer of the call to the another telecommunications device;
    utilizing a lead digital signal to establish a connection between the IP telephone and the another telecommunications device, if the another telecommunications device comprises a non-wide-band telecommunications device;
    converting the up to four digital signals carrying the call to a wide-band signal at the IP gateway;
    thereafter passing the wide-band signal converted from the IP gateway to the another telecommunications device over a telecommunications interface as determined by the telecommunications switch to thereby complete the call from the IP telephone to the another telecommunications device; and
    sending a busy signal to the IP telephone if the at least one timeslot is not available when reserving the up to four digital signals for the call.

11. A system for providing wide-band voice service via a telecommunication switch, the system comprising:

an IP telephone from which a call is initiated to another telecommunications device through an IP gateway associated with at least one telecommunications network;

an IP gateway associated with the at least one telecommunications network, wherein up to four digital signals are reserved for the call, in response to a request from a gateway to a telecommunications switch associated with the at least one telecommunication network; and a telecommunications switch associated with the at least one telecommunications network, wherein the telecommunications switch analyzes an identification number associated with the another telecommunications device to determine if the another telecommunications device comprises a wide-band telecommunication device or a narrow-band telecommunications device, thereby permitting a completion of the call from the wide-band telecommunications device to the another telecommunications utilizing the up to four digital signals and the telecommunications switch over the at least one telecommunications network;

wherein a busy signal is sent to the IP telephoner if at least one timeslot is not available to permit a transfer of the call to the another telecommunications device when reserving the up to four digital signals for the call.

12. The system of claim 11 wherein:

the call from the wide-band telecommunications device is completed to the another telecommunications device as a wide-band call utilizing at least one of the up to four digital signals, if the another telecommunications device comprises a wide-band telecommunications device; and the call from the wide-band telecommunications device to the another telecommunication device is completed as a narrow-band call utilizing at least one of the up to four digital signals, if the another telecommunications device comprises a narrow-band telecommunications device.

13. The system of claim 11 wherein at least one digital signal is reserved or the call, if the telecommunications switch determines that the at least one timeslot is available to permit a transfer of the call to the another telecommunications device.

14. The system of claim 11 wherein a lead digital signal establishes a connection between the IP telephone and the another telecommunications device, if the another telecommunications device comprises a non-wide-band telecommunication device.

15. The system of claim 11 wherein the telecommunications interface comprises a GR-303 connection.

16. The system of claim 11 wherein the telecommunications switch comprises a class 5 circuit switch.

17. The system of claim 11 further comprising a conversion module, which converts the wide-band signal at the gateway to a narrow-band signal if the call is terminated at a line which is not wide-band equipped.

18. The system of claim 17 wherein the conversion module further comprises:

instruction media residing in a computer for instructing the computer to convert the up to four digital signals to the wide-band signal; and signal-bearing media.

19. The system of claim 18 wherein the signal bearing media further comprises transmission media.

20. The system of claim 19 wherein the signal-bearing media further comprises recordable media.

* * * * *